United States Patent Office.

SAMUEL C. MOORE, OF BOSTON, MASSACHUSETTS.

Letters Patent No. 92,337, dated July 6, 1869.

IMPROVEMENT IN NICKEL-LINED CULINARY VESSELS.

The Schedule referred to in these Letters Patent and making part of the same.

*To all whom it may concern:*

Be it known that I, SAMUEL C. MOORE, of Boston, in the county of Suffolk, and State of Massachusetts, have invented a new and useful Improvement in Linings for Culinary Vessels; and I do hereby declare the following to be a full and correct description of the same.

My invention consists in coating the interior surface of pots, kettles, saucepans, and other culinary vessels, with nickel, either by electro-deposition or otherwise.

The nickel lining possesses the advantages of being hard, smooth, unaffected by heat, not liable to cracking or corrosion, or to impart any taste, or produce any injurious effect upon the articles cooked, and in these particulars, as well as in cheapness, it surpasses the ordinary linings of porcelain or tin.

What I claim, and desire to secure by Letters Patent, is—

A vessel for culinary purposes, having a lining of nickel, applied by electro-deposition or otherwise.

The above specification of my said invention signed and witnessed at Washington, this 9th day of June, A. D. 1869.

SAMUEL C. MOORE.

Witnesses:
F. W. HOWARD,
CHAS. F. STANSBURY.